United States Patent
Yuan et al.

(10) Patent No.: US 9,255,307 B2
(45) Date of Patent: Feb. 9, 2016

(54) TANTALUM-MATERIAL MULTILEVEL DISTILLATION CRUCIBLE AND DISTILLATION PROCESS

(75) Inventors: Ping Yuan, Jiangxi (CN); Limin Tao, Jiangxi (CN); Qiuhua Xu, Jiangxi (CN)

(73) Assignee: Jiangxi Rare Earth and Rare Metals Tungsten Group Holding Co., Ltd., Jiangxi (CN)

( * ) Notice: Subject to any disclaimer, the term of this patent is extended or adjusted under 35 U.S.C. 154(b) by 111 days.

(21) Appl. No.: 14/110,958

(22) PCT Filed: Apr. 10, 2012

(86) PCT No.: PCT/CN2012/073688
§ 371 (c)(1),
(2), (4) Date: Oct. 16, 2013

(87) PCT Pub. No.: WO2012/139484
PCT Pub. Date: Oct. 18, 2012

(65) Prior Publication Data
US 2014/0034480 A1  Feb. 6, 2014

(30) Foreign Application Priority Data
Apr. 11, 2011  (CN) .......................... 2011 1 0089343

(51) Int. Cl.
C22B 59/00 (2006.01)
F27B 14/14 (2006.01)
F27B 14/10 (2006.01)
F27B 14/06 (2006.01)
C22B 9/02 (2006.01)
F27B 14/08 (2006.01)

(52) U.S. Cl.
CPC . *C22B 9/02* (2013.01); *C22B 59/00* (2013.01); *F27B 14/06* (2013.01); *F27B 14/10* (2013.01); *F27B 14/14* (2013.01); *F27B 2014/0825* (2013.01); *F27B 2014/102* (2013.01); *Y02P 10/234* (2015.11)

(58) Field of Classification Search
CPC ................... F27B 2014/102; F27B 2014/0825
See application file for complete search history.

(56) References Cited

U.S. PATENT DOCUMENTS

2003/0025253 A1* 2/2003 Popov et al. .................. 266/208
2005/0178315 A1* 8/2005 Helava et al. .................... 117/13

FOREIGN PATENT DOCUMENTS

CA  2743543     6/2010
GB  466763 A *  6/1937   .............. C22B 26/20

* cited by examiner

*Primary Examiner* — In Suk Bullock
*Assistant Examiner* — Jonathan Pilcher
(74) *Attorney, Agent, or Firm* — Hammer & Associates, P.C.

(57) ABSTRACT

A tantalum-material multilevel distillation crucible; the distillation crucible comprises a crucible body (1), an insulation plate (2), and a receiving hood (3); the insulation plate (2) is sheathed in the upper part of the crucible body (1), and the receiving cover is disposed on top of the crucible body (1) and above the insulation plate (2); the crucible body (1) is made of tantalum in a horn-shaped circular truncated cone increasing in size from top to bottom; and the insulation plate (2) is made of a high-temperature resistant refractory material with good insulation performance, characterized by: the insulation plate (2) comprises of a plurality of insulation plates that can be stacked and used (2); and a heating unit (6) provided with a plurality of pads (5) that can be stacked and used at the bottom of the crucible. According to the present invention, the height of a crucible buried in a heat source can be adjusted, enabling one crucible to be used for distillation of various kinds of rare earth metals.

9 Claims, 1 Drawing Sheet

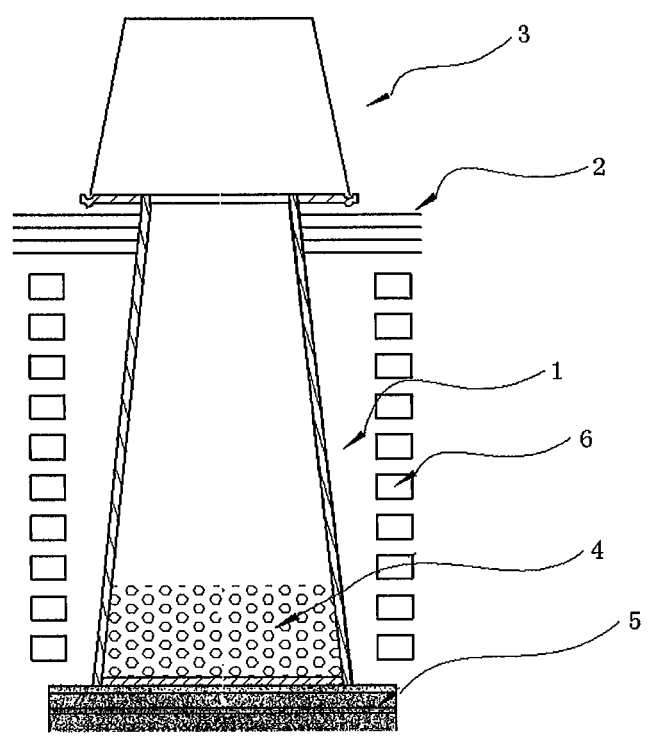

US 9,255,307 B2

TANTALUM-MATERIAL MULTILEVEL DISTILLATION CRUCIBLE AND DISTILLATION PROCESS

TECHNICAL FIELD

The present invention relates to a multi-stage or multilevel distillation crucible made of tantalum material, which is a distillation crucible made of special materials used for vacuum distillation and purification of rare earth metals.

As used in this patent specification, the term "multilevel" can be also called "multi-stage" which refers to such a case that the temperature difference formed between the upper outlet of the crucible and the bottom of the crucible is different if the depth of the crucible buried in the heat generator/heat resource is different. The multilevel distillation is carried out by forming multiple temperature differences, in which different temperature differences are required for producing different metals.

As used in this patent specification, the term "temperature gradient" refers to the temperature difference between the top of the heat-insulation plate and the bottom of the crucible.

PRIOR ART

Vacuum distillation is based on the different vapor pressures and different evaporation rates of different rare earth metals and impurity elements at different temperatures, thus the rare earth metals can be separated from the impurity elements by vacuum distillation.

In prior art, the crucible is buried in the heat generator with a fixed depth, and it is not easy to change the temperature difference formed between the upper outlet of the crucible and the bottom of the crucible. Accordingly, different crucibles have to be required for producing different metals. Therefore, enterprises have to prepare a series of crucibles with different sizes. However, crucibles which are made of tantalum are of high cost. Moreover, as the outlet of a crucible is of a relative small size, a large metal block cannot be put into the crucible, and has to be broken before distillation.

SUMMARY OF THE INVENTION

An object of the present invention is to provide a multilevel distillation crucible made of tantalum material, whose depth buried in a heat source is adjustable, so different temperature difference suitable for melting and purifying various kinds of rare earth metals can be formed between the upper outlet of the crucible and the bottom of the crucible, therefore one crucible can be used for the distillation of various kinds of rare earth metals.

To this end, according to one aspect of the present invention, there is provided a multilevel distillation crucible made of tantalum material, in which said distillation crucible comprises a crucible body, a heat-insulation plate and a receiving hood; said heat-insulation plate is fitted around the upper end of the crucible body, while the receiving hood is provided at the top of said crucible body, located above the heat-insulation plate; said crucible body is made of tantalum, taking a shape of trumpet-like truncated cone with a smaller top and a larger bottom; said heat-insulation plate is made of a refractory material with high-temperature resistance and good heat-insulating properties, characterized in that, said heat-insulation plate includes multiple heat-insulation plates which can be stacked for use; several spacer sheets are provided within the heat generator which can be stacked for use at the bottom of the crucible.

Preferably, said refractory material is a high alumina brick, a corundum plate, a graphite plate or a tantalum material.

Preferably, said crucible body has a thickness of 2-3 mm.

Preferably, said crucible body has a diameter of top opening of 100-250 mm, a bottom inner diameter of 300-500 mm, and a height of 250-400 mm.

According to another aspect of the present invention, there is provided a distillation process of a multilevel distillation crucible made of tantalum material, in which said distillation crucible comprises a crucible body, a heat-insulation plate and a receiving hood; said heat-insulation plate is fitted around the upper end of the crucible body, while the receiving hood is provided at the top of said crucible body, located above the heat-insulation plate; said crucible body is made of tantalum, taking a shape of trumpet-like truncated cone with a smaller top and a larger bottom; said heat-insulation plate is made of a refractory material with high-temperature resistance and good heat-insulating properties, characterized in that, the temperature difference between the top of the heat-insulation plate and the bottom of the crucible is adjusted by changing the number of the heat-insulation plates.

Preferably, the height of the crucible inside the heat generator is adjusted further by adding or reducing the number of spacer sheets, thereby regulating the temperature difference between the top of the heat-insulation plate and the bottom of the crucible.

Preferably, said crucible body has a thickness of 2-3 mm, said crucible body has a top diameter of 100-250 mm, a bottom diameter of 300-500 mm, and a height of 250-400 mm.

According to another aspect of the present invention, there is provided a distillation process of a multilevel distillation crucible made of tantalum material, wherein said distillation crucible comprises a crucible body, a heat-insulation plate and a receiving hood; said heat-insulation plate is fitted around the upper end of the crucible body, while the receiving hood is provided at the top of said crucible body, located above the heat-insulation plate; said crucible body is made of tantalum, taking a shape of trumpet-like truncated cone with a smaller top and a larger bottom; said heat-insulation plate is made of a refractory material with high-temperature resistance and good heat-insulating properties, characterized in that, the height of the crucible inside the heat generator is adjusted by adding or reducing the number of spacer sheets, thereby regulating the temperature difference between the top of the heat-insulation plate and the bottom of the crucible.

Preferably, the temperature difference between the top of the heat-insulation plate and the bottom of the crucible is adjusted further by adding or reducing the number of the heat-insulation plates.

Preferably, said crucible body has a thickness of 2-3 mm, said crucible body has a top inner diameter of 100-250 mm, a bottom inner diameter of 300-500 mm, and a height of 250-400 mm.

Rare earth metals have high chemical activities at high temperatures and react readily with other substances, so for the multilevel distillation crucible according to the present invention, a tantalum material as a rare metal is selected to make the crucible body. Tantalum has high chemical stability and corrosion resistance, thus during distillation according to the present invention, the possible recontamination of products caused by the crucible impurities during distillation and purification can be prevented.

The multilevel distillation crucible according to the present invention has a sloping and especially a conical structure with a smaller top and a larger bottom, which can block radiation heats, such that a temperature difference is formed between the receiving hood at the top of the crucible and the crucible body below the heat-insulation plate. Different distillating metals have different melting points, so the requirements for receiving temperature inside the receiving hood (condensing zone) are different.

For the multilevel distillation crucible made of tantalum material according to the present invention, the crucible body is buried in the heat generator, the upper portion of the crucible is insulated from the lower portion of the crucible by a refractory material (heat-insulation plate), radiant and conductive heat is blocked, such that a condensing zone is formed inside the top receiving hood, and the metals distilled out are received into the receiving hood of the top condensing zone.

For the multilevel distillation crucible made of tantalum material according to the present invention, the depth/height (inside the heat generator) of the crucible can be adjusted by adding or reducing the number of spacer sheets or pads, and/or the temperature of the condensing-receiving zone is regulated by changing the number of the heat-insulation plates, such that metals with different melting points and different vapor pressures can be distilled and purified.

During the use of the multilevel distillation crucible made of tantalum material according to the present invention, rare earth metals to be distilled and purified are placed at the bottom of the crucible, which is put within a heat generator and heated. Rare earth metals with low melting points and high vapor pressures are received into the condensing zone, while the impurity metals with high melting points and low vapor pressures are left in the crucible.

BRIEF DESCRIPTION OF THE ACCOMPANYING DRAWING

FIG. 1 is a schematic view of the structure of the multilevel distillation crucible made of tantalum material according to the present invention.

DETAILED DESCRIPTION OF THE PREFERRED EMBODIMENTS

As shown in FIG. 1, the multi-stage or multilevel distillation crucible made of tantalum material according to the present invention comprises a crucible body 1, a plurality of layers of heat-insulation plate 2, and a receiving hood 3. A middle hole of the heat-insulation plate 2 is in engagement with the upper end of the crucible body 1, while the receiving hood 3 is provided above the heat-insulation plate 2.

The crucible body 1 is of a pagoda-like shape, or horn-shaped, that is, a trumpet-shaped truncated cone with a smaller top and a larger bottom, the upper portion of which is provided with one or more layers of heat-insulation plate 2, the top of the heat-insulation plate 2 is provided with a receiving hood 3 thereon. Said crucible body 1 is made of tantalum material with a thickness of 2-3 mm. For the truncated cone, the (inner or outer) diameter of top opening is 100-250 mm, the (inner or outer) diameter of bottom is 300-500 mm, and the height is 250-400 mm, thus it is a sloping structure with a small top and a large bottom, which facilitates blocking different radiant heats, thereby forming different temperature gradients.

During the use of the multilevel distillation crucible according to the present invention, inside the heat generator or heat resource 6, the height of the crucible is adjusted by adding or reducing the number of spacer sheets or pads 5, thus metals with different melting points and different vapor pressures can be distilled and purified differently. The temperature of the condensing-receiving zone is adjusted by changing the number of the heat-insulation plates 2. Rare earth metals 4 to be distilled and purified are placed on the bottom inside of the crucible, which is inserted into a heat generator 6 to be heated. After passing through the present apparatus, rare earth metals with low melting points and high vapor pressures can be received into different condensing zones (receiving hood 3) according to temperature gradients, while the impurity metals with high melting points and low vapor pressures remain in the crucible.

In the present invention, there are three ways by which a temperature difference is generated between the crucible body 1 and the condensing zone (receiving hood 3): blocking the radiant heats by the trumpet-like slope surface between the top and the bottom of the crucible; blocking the radiant heats by the heat-insulation plates; and using a refractory material which is resistant to high temperature and difficult to conduct heat as the heat-insulation plate to block the radiant heats from the crucible body, such that the temperatures within the crucible body are different from the temperatures within the receiving hood.

The distillation crucible is welded from tantalum materials, in which the thickness of tantalum sheet usually is 2-3 mm. The main body of the crucible is buried in the heating zone 6. The upper portion of the crucible is blocked by a refractory material, preventing from radiant and conductive heat, such that a condensing zone is formed above, and the metals distilled out are received into the receiving hood in the top condensing zone.

When metals with different melting points and different vapor pressures are distilled by the crucible, multiple temperature differences are regulated by the following methods:

A) the depth of the crucible inside the heat generator is adjusted by adding or reducing the number of spacer sheets; and/or B) the temperature of the condensing-receiving zone is regulated by adding or reducing the number of the heat-insulation plates.

The invention claimed is:

1. A multilevel distillation crucible made of a tantalum material, in which said distillation crucible comprises:
    a crucible body, a heat-insulation plate, and a receiving hood;
    said heat-insulation plate is fitted around an upper end of the crucible body, while the receiving hood is provided at a top of said crucible body and located above the heat-insulation plate;
    said crucible body is made of tantalum with a shape of trumpet-like truncated cone whereby said shape of the crucible body facilitates blocking radiant heat and creates within said crucible body a temperature difference between the crucible body and the condensing zone;
    said heat-insulation plate is made of a refractory material with high-temperature resistance and heat-insulating properties;
    said heat-insulation plate includes a plurality of heat-insulation plates which are stacked for use; wherein said crucible body has an inner or outer top diameter of 100-250 mm, an inner or outer bottom diameter of 300-500 mm, and a height of 250-400 mm; and
    several spacer sheets or pads which can be are stacked for use at the bottom of the crucible body are provided within a heat resource.

2. The multilevel distillation crucible of claim 1, wherein said refractory material is a high alumina brick, a corundum plate, a graphite plate or a tantalum material.

3. The multilevel distillation crucible of claim 1, wherein a wall of said crucible body has a thickness of 2-3 mm.

4. A distillation process with a multilevel distillation crucible made of a tantalum material, wherein said process comprises the steps of
  providing said distillation crucible including:
    a crucible body, a heat-insulation plate and a receiving hood;
    said crucible body is made of tantalum with a shape of trumpet-like truncated cone having an inner or outer top diameter of 100-250 mm, an inner or outer bottom diameter of 300-500 mm, and a height of 250-400 mm, whereby said shape of the crucible body is facilitates blocking radiant heat and creates within said crucible body a temperature difference between the crucible body and the condensing zone;
    said heat-insulation plate is made of a refractory material with high-temperature resistance and geed heat-insulating properties;
  fitting said heat-insulation plate around an upper end of the crucible body, while the receiving hood covers a top of said crucible body and is above the heat-insulation plate;
  adjusting a temperature difference between a top of the heat-insulation plate and a bottom of the crucible body by alternating a number of the heat-insulation plates;
  placing rare earth metals to be distilled at the bottom of the crucible, and
  heating the crucible to distill the rare earth metals.

5. The distillation process of claim 4, further comprising the step of adjusting a height of the crucible body inserted in a heat resource by adding or reducing a number of spacer sheets, thereby further adjusting the temperature difference between the top of the heat-insulation plate and the bottom of the crucible body.

6. The distillation process of claim 4, wherein a wall of said crucible body has a thickness of 2-3 mm.

7. A distillation process with a multilevel distillation crucible made of a tantalum material, wherein said process comprises the steps of
  providing said distillation crucible including:
    a crucible body, a heat-insulation plate, and a receiving hood;
    said crucible body is made of tantalum with a shape of trumpet-like truncated cone having an inner or outer top diameter of 100-250 mm, an inner or outer bottom diameter of 300-500 mm, and a height of 250-400 mm, whereby said shape of the crucible body is facilitates blocking radiant heat and creates within said crucible body a temperature difference between the crucible body and the condensing zone;
    said heat-insulation plate is made of a refractory material with high-temperature resistance and heat-insulating properties;
  fitting said heat-insulation plate around an upper end of the crucible body, while the receiving hood covers a top of said crucible body and is above the heat-insulation plate;
  adjusting a depth of the crucible body inserted in a heat resource by adding or reducing a number of spacer sheets or pads at a bottom of the crucible body, thereby adjusting temperature difference between a top of the heat-insulation plate and the bottom of the crucible body;
  placing rare earth metals to be distilled at the bottom of the crucible, and
  heating the crucible to distill the rare earth metals.

8. The distillation process of claim 7, further comprising the step of adjusting the temperature difference between the top of the heat-insulation plate and the bottom of the crucible body by changing a number of the heat-insulation plates.

9. The distillation process of claim 7, wherein a wall of said crucible body has a thickness of 2-3 mm.

\* \* \* \* \*